UNITED STATES PATENT OFFICE.

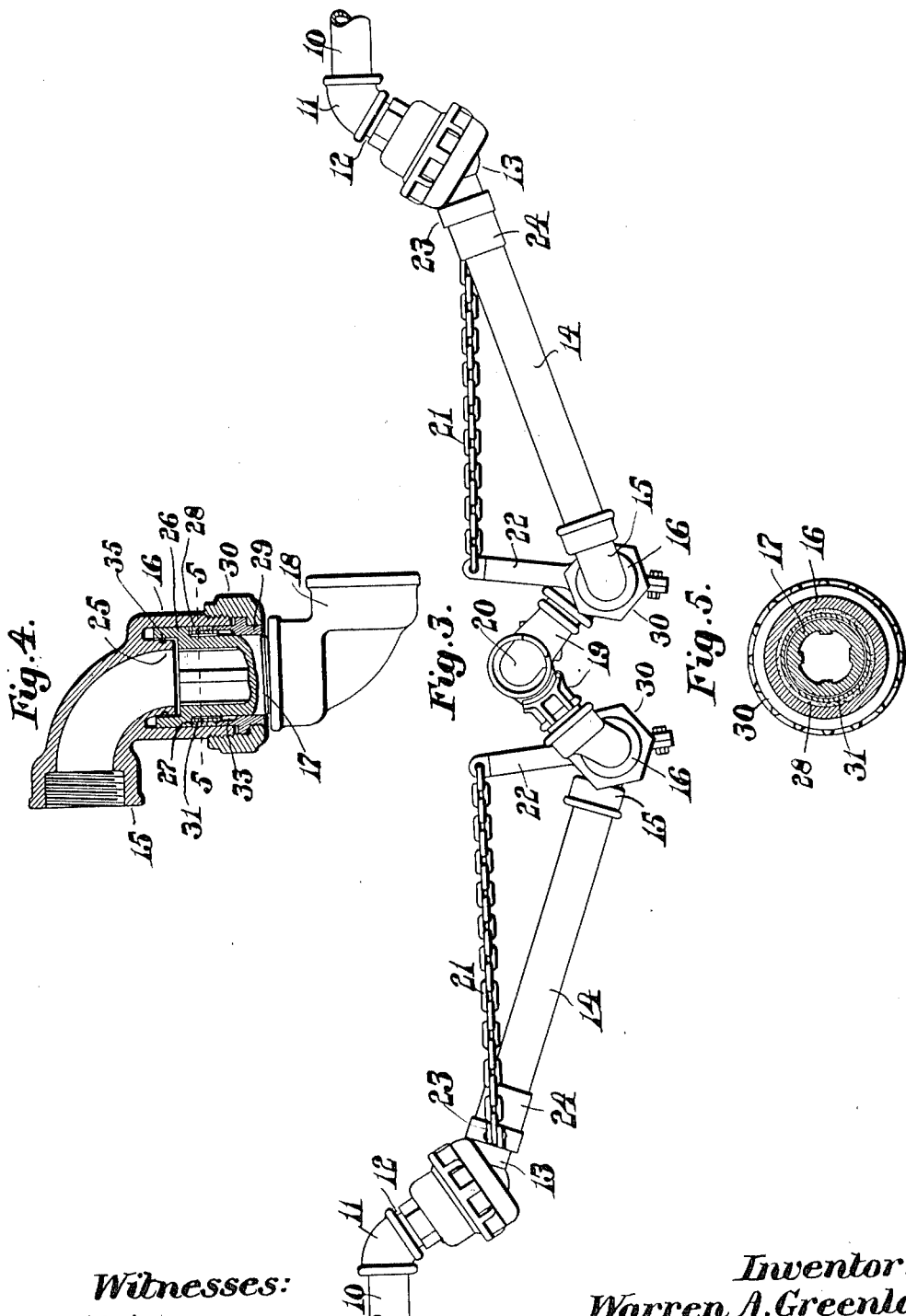

WARREN A. GREENLAW, OF MELROSE HIGHLANDS, MASSACHUSETTS, ASSIGNOR TO THE GREENLAW MANUFACTURING CO., OF BOSTON, MASSACHUSETTS, A CORPORATION OF MAINE.

SYSTEM OF TRAIN-PIPE CONNECTIONS.

1,001,588.   Specification of Letters Patent.   Patented Aug. 22, 1911.

Application filed March 19, 1910. Serial No. 550,536.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Systems of Train-Pipe Connections, of which the following is a specification.
This invention relates to train pipe connections and particularly to the devices for connecting the train pipes that are used for the purpose of conveying air to the air brakes, the object of the invention being to provide a system that will afford ample opportunity for the connections to be subjected to normal strains without effecting the uncoupling of the coupling members while such uncoupling will be automatically and positively effected by any abnormal strain such as the separation of the cars.

The invention consists in certain novel features of construction and arrangement of parts which will be readily understood by reference to the description of the drawings and to the claims hereinafter given.

Figure 1:
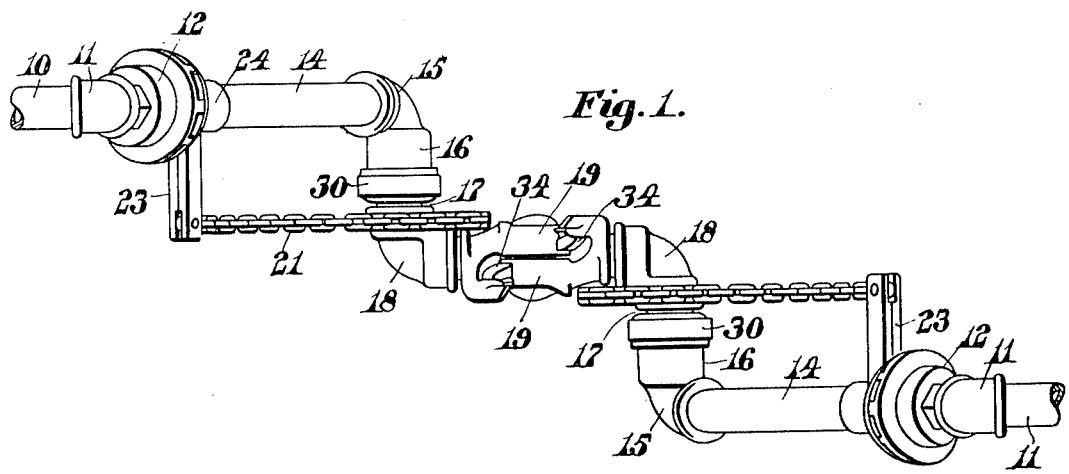
Figure 2:
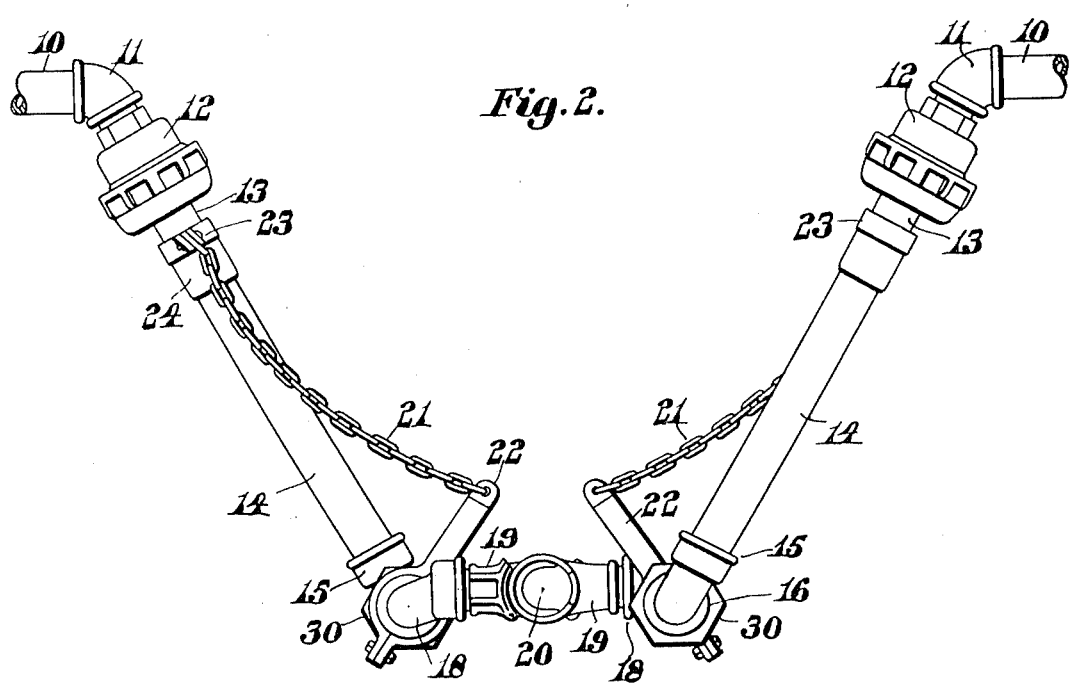

Of the drawings: Figure 1 represents a plan of a train pipe connection embodying the features of the present invention. Fig. 2 represents an elevation of the same in its normal position. Fig. 3 represents a similar view of the same connection in the position the various members assume when the cars begin to separate. Fig. 4 represents a section through one of the rotary joints, and Fig. 5 represents a transverse section of the same, the cutting plane being on line 5—5 on Fig. 4.

Similar characters designate like parts throughout the several figures of the drawings.

In the drawings, 10 represents a train pipe to the end of which is secured an elbow 11, the opposite end of which has mounted thereon a fixed member 12 of a ball and socket joint, the movable member 13 of which has connected thereto a pendant pipe section 14. To the lower end of this pendant pipe section 14 is secured an elbow 15 one branch 16 of which is horizontal and cup-shaped forming a socket member into which extends a male member 17 on the outer end of which is mounted an elbow 18, the other branch of which connects with a coupling member 19. This coupling member may be of any well-known construction, as, for instance, the Westinghouse coupler in general use upon steam railroads.

The two coupling members 19 lock together about the horizontal axes 20 thereof and can only be broken by moving the members 19 about this axis 20. One great difficulty found to exist in the use of this coupler where metallic pipe sections are used to connect the two members thereof with the train pipes 10 is that under normal strains to which the pipe connections are subjected the coupling members 19 are liable to be moved about this axis 20 and cause an uncoupling or if the strain is not sufficient to uncouple the pipe members it is liable to move the members sufficiently to cause a leakage between the two members 19. This is obviously very objectionable and the present invention is for the purpose of overcoming this difficulty. Heretofore as far as is known the center 20 is below a line drawn between the horizontal axis of the rotary joints to which these coupling members 19 are secured. Obviously when the pipes are thus connected with the coupling members normal strain thereon will cause the center 20 to be raised and in so doing the coupling members 19 will be moved about the center 20 and thereby cause a leakage of the coupling. This objection has been wholly obviated by placing the center 20 above a line drawn between the horizontal axes of a rotary joint 17 so that normal strains brought to bear upon the pipe connections due to excessive speed of the train and the consequent jar of the various members attached thereto will cause the center 20 to seek to move downwardly, thereby more firmly locking the couplers together and preventing any movement thereof which would tend to uncouple the members 19 or cause a leakage between the two. This result is obtained without changing the ordinary coupling members 19 by making the elbow 18 secured to the outer ends thereof downwardly inclined so that the branch thereof which connects with the movable member 17 of the rotary joint will have its axis considerably below the center 20. This forms an important feature of the present invention as it overcomes difficulties which have been found to exist in pipe connections of this type when used for connecting the air pipes leading to the air brakes. It is obvious, however, that some means must be provided whereby when there is an actual separation of the cars the strain upon the coupling members 19 will not be such as to move the center 20 downwardly but will positively move the center 20 upwardly into the position shown in Fig. 3 of the drawings, at which point the coupling members 19 will be permitted to separate and the pendant pipes 14 again drop by their own weight about the pivot of the movable member 13. This positive uncoupling operation is provided for by means of a flexible connector such as the chain 21 secured to a member projecting from either the coupling member itself or the elbow 18 to which it is secured.

It is obvious that it is immaterial what kind of a member is used as long as the coupling member 19 is moved about the horizontal axis of the rotary joint 17.

Preferably an arm 22 is clamped to the lateral branch of the elbow 18 and one end of the chain 21 is secured to the end thereof so as to obtain suitable leverage.

The opposite end of the chain 21 is secured to an arm 23 extending laterally from the pipe member 14 and bearing against the collar 24 mounted thereon.

It is obvious that owing to the slack in the chain 21 when the train pipe connections are in use any normal strain upon these connections will not effect any movement of the arm 22 to cause a raising of the center 20. As soon, however, as the cars are uncoupled and they commence to separate the pendant pipe sections 14 will be raised into the position shown in Fig. 3 of the drawings and during this movement the chain 21 will first become taut and then commence to pull upon the arms 22 thereby causing the coupling members 19 to assume the position shown in said Fig. 3.

When the center 20 has moved up on a vertical line to the point shown in this Fig. 3 the coupling members 19 will be in such position as to permit the complete separation of the two members 19. The pendant pipe sections 14 will then move about the center of the ball joint and assume a substantially vertical position, the chain 21 preventing the coupling members 19 from moving downwardly about the horizontal axis of the rotary joint into a position where it is liable to be injured.

The rotary joint 15, such as is used in this system of pipe connection, has within the cup-shaped portion 16 an inwardly extending flange 25 which extends into the inner end of the male member 17 of said joint. This member 17 is provided on its extreme end with an annular flanged extension 26 surrounding the extension 25 but free from contact therewith, the periphery of said extension fitting so as to rotate thereon the inner wall of the socket portion 16. This extension 26 is of greater diameter than the body of the part 17 of the joint thereby forming a shoulder 27 against which the packing 28 is forced by means of a follower 29 within the outer end of the socket portion 16 and movable therein by means of the nut 30 threaded to said portion 16.

The inner end of the bore of the follower 29 is of sufficient diameter to form a recess adapted to receive the end of a ring 31 surrounding the body portion of the member 17 and resting against the shoulder 27. This ring 31 is surrounded by means of the packing 28 forced outwardly by means of the follower 29 into contact with the inner wall of the socket member 16 to thoroughly pack the joint between the rotatable member 17 and the non-rotatable member 16.

The ring 31 is retained by the packing 28 in a position concentric to the axis of the rotatable member 17 with its inner wall free from contact with the periphery thereof so that no friction occurs between these two parts during the rotation of the movable member 17.

The end of the ring 31 extending into the recess 33 in the follower 29 fits the inner wall thereof so that the packing is prevented from entering said recess. As the packing wears and the follower is moved toward the shoulder 27 the ring 31 will move farther into the recess 33. This forms an important feature of the present invention as it provides a rotary joint adapted especially for use in connection with this system of pipe connections in which the joint between the two parts movable relative to each other is thoroughly packed while at the same time the friction between the parts is reduced to a minimum.

Each coupling member 19 is provided with stops 34 which engage with shoulders on the opposing coupling member and prevent the center of the coupling member passing below a line connecting the axis of the rotary joint. On the periphery of the inwardly extending annular flange 25 is mounted a packing member 35 which prevents any grit or dirt within the rotary joint from passing into the space between the periphery of the annular member 25 and the inner wall of the socket 16 thus keeping the joints between the rotary member and the fixed member free from dirt, grit and other foreign substances.

It is believed that the operation and many advantages of the invention will be fully understood from the foregoing.

Having thus described my invention, I claim:

1. In a device of the class described, the combination of two train pipes; a pendant pipe jointed to the end of each; a coupling member pivotally jointed to the lower end of said pendant pipe and adapted to move about the axis of said joint to engage an opposed coupling member; stops upon said coupling members preventing the center of said coupling members passing below a line connecting the axis of said joints; and means interposed between each coupling member and a higher member and secured directly to said members adapted to positively unlock said coupling members when the cars separate.

2. In a device of the class described, the combination of two train pipes; a pendant pipe jointed to the end of each; a coupling member connected to the lower end of said pendant pipe by a rotary joint the axis of which is horizontal and adapted to move about said horizontal axis to engage an opposed coupling member; stops upon said coupling members preventing the center of said coupling members passing below a line connecting the axis of said joints; and means interposed between each coupling member and a higher member and secured directly to said members adapted to positively unlock said coupling members when the cars separate.

3. In a device of the class described, the combination of two train pipes; a pendant pipe jointed to the end of each; a coupling member pivotally jointed to the lower end of said pendant pipe and adapted to move about the axis of said joint to engage an opposed coupling member; stops upon said coupling members preventing the center of said coupling members passing below a line connecting the axis of said joints; and a flexible member interposed between each coupling member and a higher member and secured directly to said members adapted to positively unlock said coupling members when the cars separate.

4. In a device of the class described, the combination of two train pipes; a pendant pipe jointed to the end of each; a coupling member pivotally jointed to the lower end of said pendant pipe and adapted to move about the axis of said joint to engage an opposed coupling member; stops upon said coupling members preventing the center of said coupling members passing below a line connecting the axis of said joints; an arm rigidly secured to each coupling member and movable therewith; and a flexible member interposed between each arm and a higher member and secured directly to said members adapted to positively unlock said coupling members when the cars separate.

5. In a device of the class described, the combination of two train pipes; a pendant pipe jointed to the end of each; a rotary joint having a horizontal axis secured at one end to the lower end of said pendant pipe; a coupling member secured to the opposite end of said rotary joint and adapted to swing about the axis of said joint and lock with its opposed coupling member; a radial arm secured to the upper end of said pendant pipe; an arm radiating from the rotatable part of said rotary joint and movable therewith; and a connector between said arms whereby the coupling member will be positively swung about the axes of said rotary joints and unlocked when the cars separate.

6. In a device of the class described, the combination of two train pipes; a pendant pipe jointed to the end of each; a coupling member pivotally jointed to the lower end of each pendant pipe and adapted to move about the axis of said joint to engage an opposed coupling member; and stops upon said coupling members preventing the center of said coupling members passing below a line connecting the axis of said rotary joints.

7. In a device of the class described, the combination of two train pipes; a pendant pipe jointed to the end of each; two coupling members adapted to lock together and each provided with a downwardly inclined end; and a rotary joint connecting each downwardly inclined end with the lower end of a pendant pipe.

8. In a device of the class described, the combination of two train pipes; a pendant pipe jointed to the end of each; two coupling members adapted to lock together; a downwardly extending elbow secured to each coupling member with one branch horizontal; an elbow secured to the lower end of each pendant pipe with one branch horizontal; a rotary joint interposed between the horizontal branches of each pair of elbows; and a flexible member connecting the rotary member of said rotary joint with the upper end of said pendant pipe and adapted to rotate said rotary member about its axis upon the complete separation of the cars.

9. In a device of the character described, the combination of two train pipes; a pendant pipe jointed to the end of each train pipe; a coupling member jointed on the lower end of each pendant pipe and adapted to interlock, said coupling members being adapted to swing about a common axis to lock and unlock; and means connected to each coupling member for normally holding said members at a predetermined angle to their respective pendant pipes, and causing said coupling members to move upwardly about said joints and disconnect by turning on their common locking axis when the vehicles carrying such train pipes separate.

10. In a device of the class described, the combination of two train pipes; a pendant pipe jointed to the end of each; a joint on the lower end of each pendant pipe; a coupling member secured to each joint and adapted to engage an opposed coupling member; and stops upon said coupling members preventing the center of said coupling members passing below a line connecting the turning of said joints.

Signed by me at 4 Post Office Sq., Boston, Mass., this 17th day of February, 1910.

WARREN A. GREENLAW.

Witnesses:
WALTER E. LOMBARD,
NATHAN C. LOMBARD.